US009785463B2

(12) United States Patent
Van De Ven et al.

(10) Patent No.: US 9,785,463 B2
(45) Date of Patent: Oct. 10, 2017

(54) USING PER TASK TIME SLICE INFORMATION TO IMPROVE DYNAMIC PERFORMANCE STATE SELECTION

(75) Inventors: Adriaan Van De Ven, Portland, OR (US); A. Leonard Brown, Weston, MA (US); Asit K. Mallick, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 1305 days.

(21) Appl. No.: 12/968,243

(22) Filed: Dec. 14, 2010

(65) Prior Publication Data
US 2011/0161981 A1    Jun. 30, 2011

Related U.S. Application Data

(60) Provisional application No. 61/290,192, filed on Dec. 26, 2009.

(51) Int. Cl.
*G06F 9/48* (2006.01)
*G06F 9/50* (2006.01)
*G06F 1/32* (2006.01)

(52) U.S. Cl.
CPC .......... *G06F 9/4843* (2013.01); *G06F 9/5094* (2013.01); *G06F 1/3296* (2013.01); *Y02B 60/1285* (2013.01); *Y02B 60/142* (2013.01); *Y02B 60/144* (2013.01)

(58) Field of Classification Search
CPC .. G06F 11/30; G06F 11/3466; G06F 11/3452; G06F 9/4843; G06F 9/5094; G06F 1/3296; Y02B 60/142; Y02B 60/144; Y02B 60/1285
See application file for complete search history.

(56) References Cited

U.S. PATENT DOCUMENTS

| | | | | |
|---|---|---|---|---|
| 2005/0138442 A1* | 6/2005 | Keller et al. | .................. | 713/300 |
| 2006/0156072 A1* | 7/2006 | Khot | .................. | G06F 11/3612 714/47.2 |
| 2007/0157206 A1* | 7/2007 | Rakvic et al. | ................ | 718/102 |
| 2008/0034072 A1* | 2/2008 | He | ..................... | H04L 41/5009 709/223 |
| 2008/0306711 A1* | 12/2008 | Bansal | ................ | G06F 11/3419 702/182 |
| 2011/0067008 A1* | 3/2011 | Srivastava | .......... | G06F 11/3466 717/128 |

OTHER PUBLICATIONS

Dean et al. ("simplified statistics for small numbers of observations", 1951, university of Oregon, Eugene, Ore., pp. 636-638).*
Acquaviva, Andrea, "Operating System Based Dynamic Power Management", OS development techniques and DPM policies, MPHS 2005, Jan. 2005, 27 pages.

* cited by examiner

*Primary Examiner* — Benjamin Wu
*Assistant Examiner* — Caroline H Arcos
(74) *Attorney, Agent, or Firm* — Alpine Technology Law Group LLC

(57) ABSTRACT

Methods and apparatus for using per task time slice information to improve dynamic performance state selection are described. In one embodiment, a new performance state is selected for a process based on one or more previous execution time slice values of the process. Other embodiments are also described.

19 Claims, 4 Drawing Sheets

USING PER TASK TIME SLICE INFORMATION TO IMPROVE DYNAMIC PERFORMANCE STATE SELECTION

RELATED APPLICATION

The present application relates to and claims priority from U.S. Provisional Patent Application No. 61/290,192, filed on Dec. 26, 2009, entitled "USING PER TASK TIME SLICE INFORMATION TO IMPROVE DYNAMIC PERFORMANCE STATE SELECTION" which is hereby incorporated herein by reference in its entirety and for all purposes.

FIELD

The present disclosure generally relates to the field of computing. More particularly, an embodiment of the invention generally relates to techniques for using per task time slice information to improve dynamic performance state selection.

BACKGROUND

Current demand based switching Performance state (P-state) algorithms (e.g., such as provided on Linux platforms) are generally based on a system load metric that is evaluated periodically (for example, every 10 to 50 milliseconds) and modified by some step size. The effect of this approach is that for most cases the ramp up to full speed (from idle) may be relatively slow and performance critical tasks may run at a lower P-state than they should for 10 milliseconds or longer. Accordingly, the performance hit caused by the ramp up delay is absorbed by the user or application.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Some of the embodiments discussed herein may use per task time slice information to improve dynamic P-state selection. The per task time slice information may include one or more previous execution durations for the process/task. Also, the terms "process" and "task" may be interchangeably used herein. Generally, P-states refer to various processor performance states (e.g., referred to as P0, P1, etc.) which correspond to speed/frequency at which a processor is operating. For example, P0 may indicate a faster operational frequency than P1. In one embodiment, feedback from a process scheduler (also referred to herein as process scheduler logic or module) is used to, e.g., for specific cases, to activate a faster P-state substantially immediately when switching processes or threads, as will be further discussed herein, e.g., with reference to FIGS. 1-4.

Figure 1:
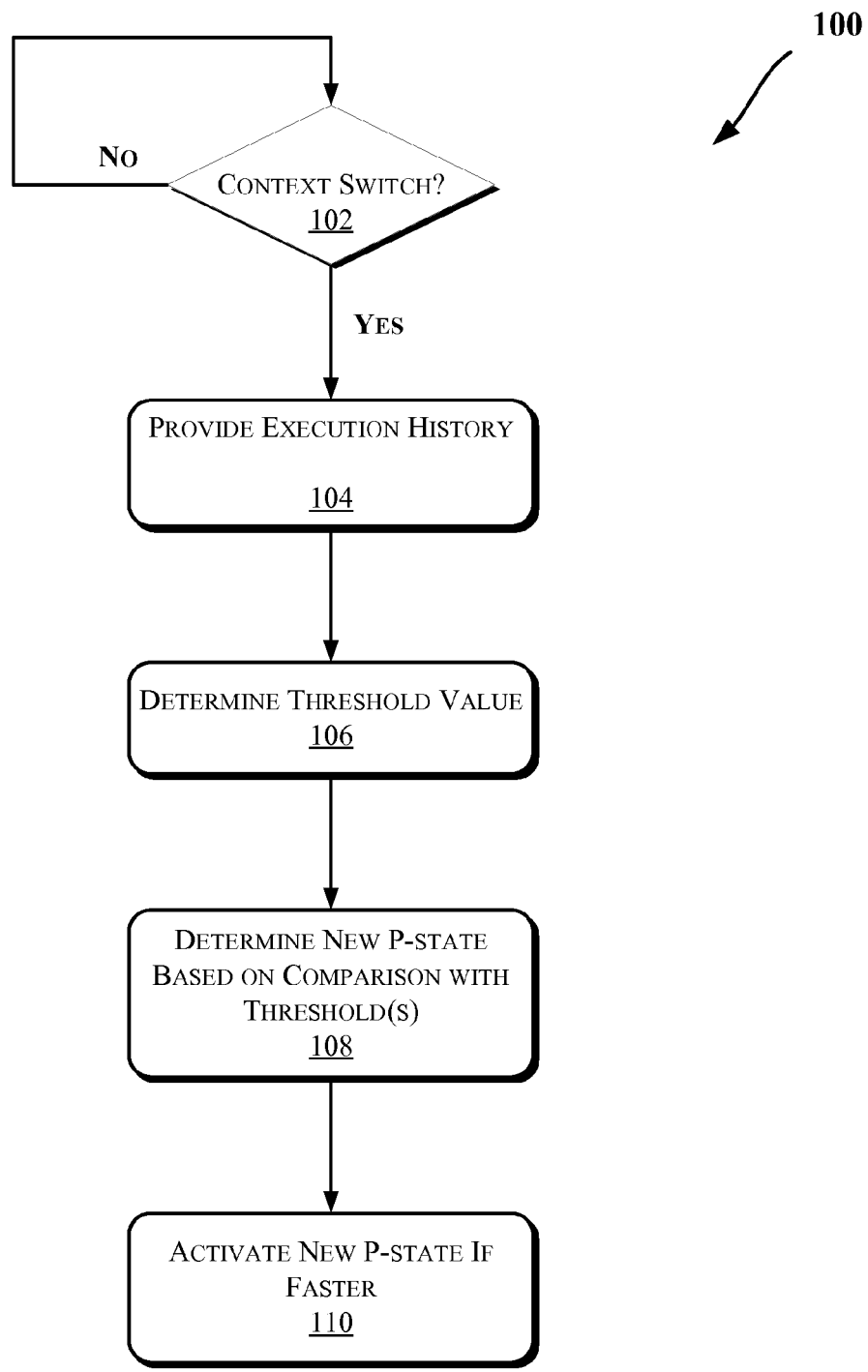
FIG. 1 illustrates a flow diagram of a method according to an embodiment of the invention.

More particularly, FIG. 1 illustrates a flow diagram of a method 100 to select a P-state, according to an embodiment. In some embodiments, one or more components discussed herein (e.g., with reference to FIGS. 2-4) may be used to perform one or more of the operations of method 100.

Referring to FIG. 1, at an operation 102, it is determined whether a context switch is to occur (e.g., based on a request by an Operating System (OS)). In one embodiment, information regarding P-state of a process being switched out is stored and the stored state is restored when the process is scheduled back in.

At an operation 104, execution history of the process (e.g., including task time slice information which indicates one or more previous execution durations for the process/task) being switched in is provided. For example, a process scheduler (such as the process scheduler 350 of FIG. 3), when switching to a new task to execute (e.g., at operation 102), may provide an up call to a P-state selection logic (such as the P-state selection logic 349 of FIG. 3) that includes specific information on the execution duration of the new process for one or more of the previous time slices that the new process being switched in has ran. As an example, if process A is being switched out for process B, and the last time process B executed it ran for 30 consecutive milliseconds, the process scheduler passes the number "30 milliseconds" to the P-state selection logic. In some embodiments, the last N durations would be communicated. The process scheduler may store or cause storage (e.g., via some other logic) data regarding execution duration of each process that is executing. In some embodiments, the process scheduler may store the execution duration data periodically and/or upon switching out of a process.

At an operation 106, a threshold value may be determined based on the execution history information provided at operation 104. For example, different threshold(s) may be determined for different processes at operation 106, e.g., depending on profile information corresponding to the process (such as priority, longevity, etc.). In an embodiment, a threshold value may be determined based on a combination of the execution history data (such as an average value, a median value, etc.).

At operation 108, a new P-state for the process being switched in (per operation 102) is determined based a comparison of the determined threshold of operation 106 (which corresponds to the execution data provided at operation 104) and one or more P-state threshold(s) (which indicate lower or upper thresholds corresponding to each P-state). In the example discussed above, assume that the processor was running in P5, e.g., at 1.2 GHz. In response to a context switching request (e.g., at operation 102), the P-state selection logic is notified that the upcoming task ran for 30 milliseconds the last time (e.g., at operation 104). If 30 milliseconds is longer than a specified threshold value (of for example 5 milliseconds at operation 106), the P-state selection logic may decide to change the processor to P0 (e.g., at operation 108), which could be at 2.4 GHz. Moreover, variations to take a (weighted) average of the last N periods rather than just the last period, and/or to go to the highest energy-efficient P-state (often P1) rather than straight to P0 are possible.

At an operation 110, the new P-state (determined at operation 108) is activated if faster than the current P-state. For example, P-state selection logic may evaluate the history information provided by the process scheduler and may decide to go to a faster P-state (e.g., at operation 108) than the current P-state immediately, independent of the periodic evaluation process discussed above. Activating a slower-than-current P-state is not performed in an embodiment. Further, as discussed above, another variation is to have multiple thresholds for going to different P-states; for example, a threshold of 5 milliseconds for activating the highest energy efficient P-state (such as P1) and a threshold of 25 milliseconds for activating the P0 P-state.

Accordingly, some embodiments have the effect that systems using P-states have fewer performance artifacts. As a result, more customers will enable P-states, saving power, etc.

Figure 2:
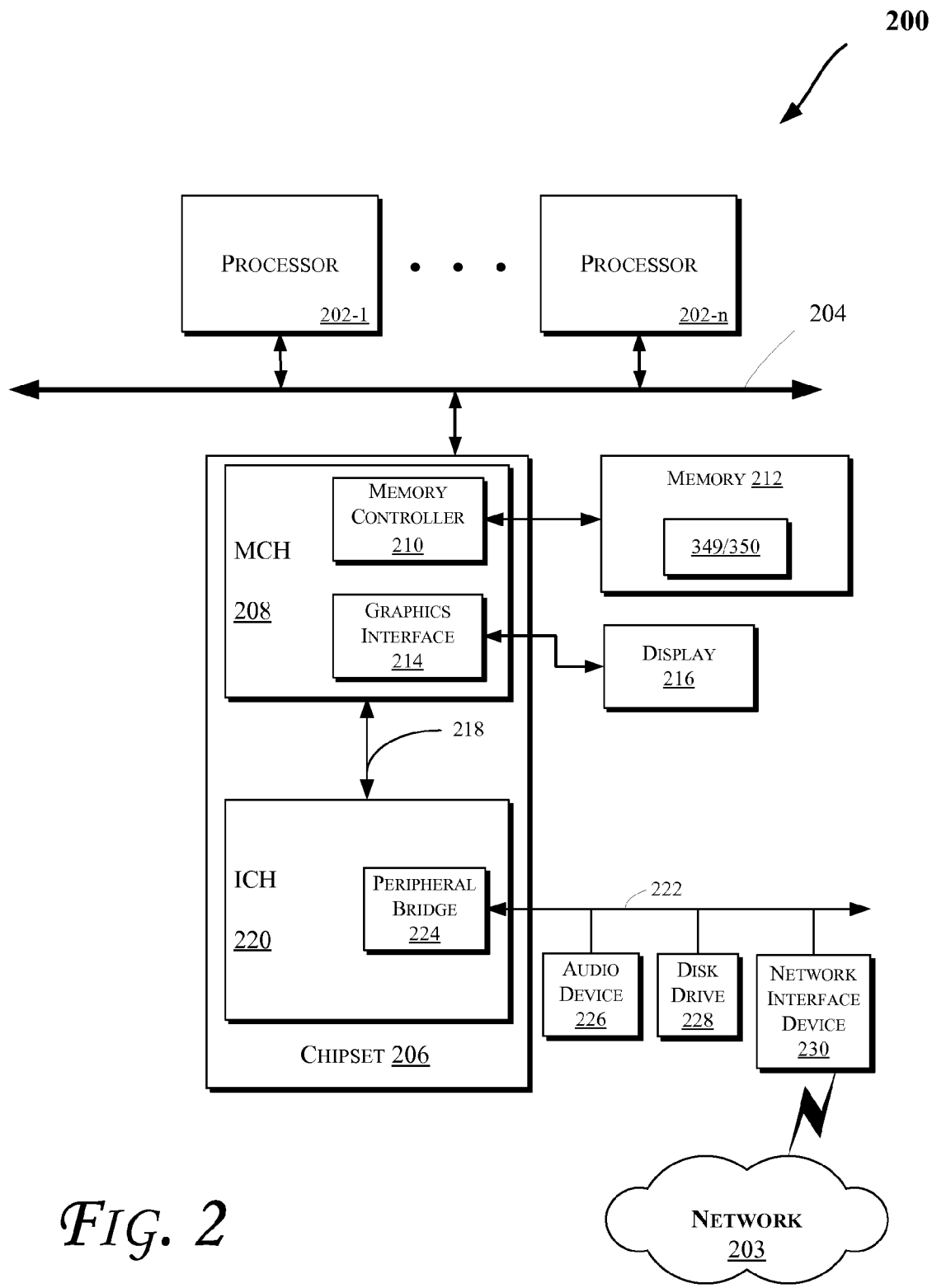
FIGS. 2 and 4 illustrate block diagrams of embodiments of computing systems, which may be utilized to implement some embodiments discussed herein.

FIG. 2 illustrates a block diagram of an embodiment of a computing system 200. In various embodiments, one or more of the components of the system 200 may be provided in various electronic devices capable of performing one or more of the operations discussed herein with reference to some embodiments of the invention. For example, one or more of the components of the system 200 may be used to perform the operations discussed with reference to FIGS. 1-4, e.g., by using per task time slice information to improve dynamic performance state selection, etc. in accordance with the operations discussed herein. Also, various storage devices discussed herein (e.g., with reference to FIGS. 2 and/or 4) may be used to store data, operation results, etc. In one embodiment, data associated with operations of method 100 of FIG. 1 may be stored in memory device(s) (such as memory 212 or one or more caches (e.g., L1 caches in an embodiment) present in processors 202 of FIG. 2 or 402/404 of FIG. 4).

Moreover, the computing system 200 may include one or more central processing unit(s) (CPUs) 202 or processors that communicate via an interconnection network (or bus) 204. The processors 202 may include a general purpose processor, a network processor (that processes data communicated over a computer network 203), or other types of a processor (including a reduced instruction set computer (RISC) processor or a complex instruction set computer (CISC)). Moreover, the processors 202 may have a single or multiple core design. The processors 202 with a multiple core design may integrate different types of processor cores on the same integrated circuit (IC) die. Also, the processors 202 with a multiple core design may be implemented as symmetrical or asymmetrical multiprocessors. Additionally, the processors 202 may utilize an SIMD (Single-Instruction, Multiple-Data) architecture.

A chipset 206 may also communicate with the interconnection network 204. The chipset 206 may include a memory control hub (MCH) 208. The MCH 208 may include a memory controller 210 that communicates with a memory 212. The memory 212 may store data, including sequences of instructions that are executed by the CPU 202, or any other device included in the computing system 200. In one embodiment of the invention, the memory 212 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 204, such as multiple CPUs and/or multiple system memories.

The MCH 208 may also include a graphics interface 214 that communicates with a display 216. The display 216 may be used to show a user results of operations associated with the fast division/inversion discussed herein. In one embodiment of the invention, the graphics interface 214 may communicate with the display 216 via an accelerated graphics port (AGP). In an embodiment of the invention, the display 216 may be a flat panel display that communicates with the graphics interface 214 through, for example, a signal converter that translates a digital representation of an image stored in a storage device such as video memory or system memory into display signals that are interpreted and displayed by the display 216. The display signals produced by the interface 214 may pass through various control devices before being interpreted by and subsequently displayed on the display 216.

A hub interface 218 may allow the MCH 208 and an input/output control hub (ICH) 220 to communicate. The ICH 220 may provide an interface to I/O devices that communicate with the computing system 200. The ICH 220 may communicate with a bus 222 through a peripheral bridge (or controller) 224, such as a peripheral component interconnect (PCI) bridge, a universal serial bus (USB) controller, or other types of peripheral bridges or controllers. The bridge 224 may provide a data path between the CPU 202 and peripheral devices. Other types of topologies may be utilized. Also, multiple buses may communicate with the ICH 220, e.g., through multiple bridges or controllers. Moreover, other peripherals in communication with the ICH 220 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 222 may communicate with an audio device 226, one or more disk drive(s) 228, and a network interface device 230, which may be in communication with the computer network 203. In an embodiment, the device 230 may be a NIC capable of wireless communication. Other devices may communicate via the bus 222. Also, various components (such as the network interface device 230) may communicate with the MCH 208 in some embodiments of the invention. In addition, the processor 202 and the MCH 208 may be combined to form a single chip. Furthermore, the graphics interface 214 may be included within the MCH 208 in other embodiments of the invention.

Furthermore, the computing system 200 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 228), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 200 may be arranged in a point-to-point (PtP) configuration such as discussed with reference to FIG. 4. For example, processors, memory, and/or input/output devices may be interconnected by a number of point-to-point interfaces.

Figure 3:
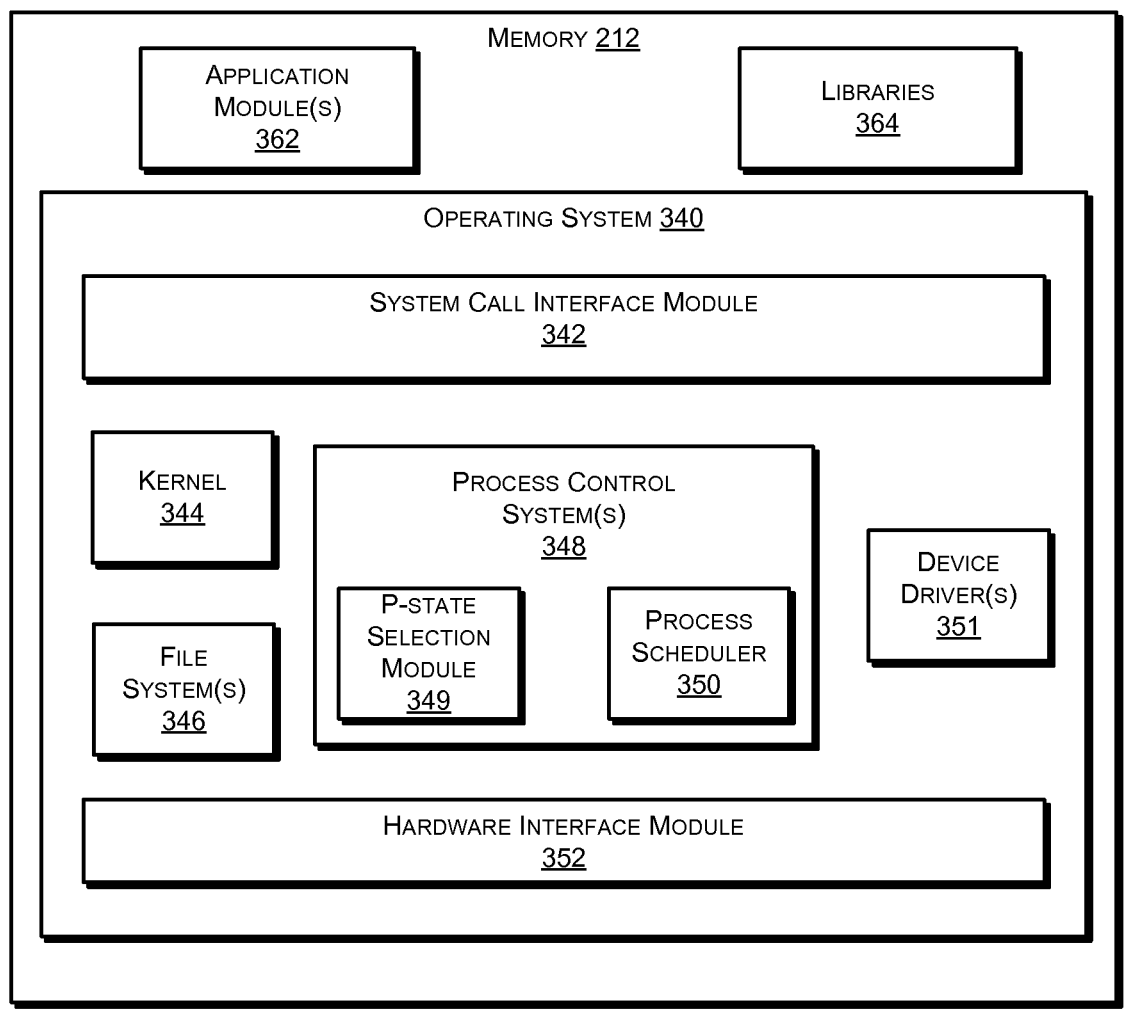
FIG. 3 is a schematic illustration of components of a storage system in accordance with some embodiments.

FIG. 3 is a schematic illustration of components of a storage device (such as the memory 212 of FIG. 2), in accordance with some embodiments.

Figure 4:
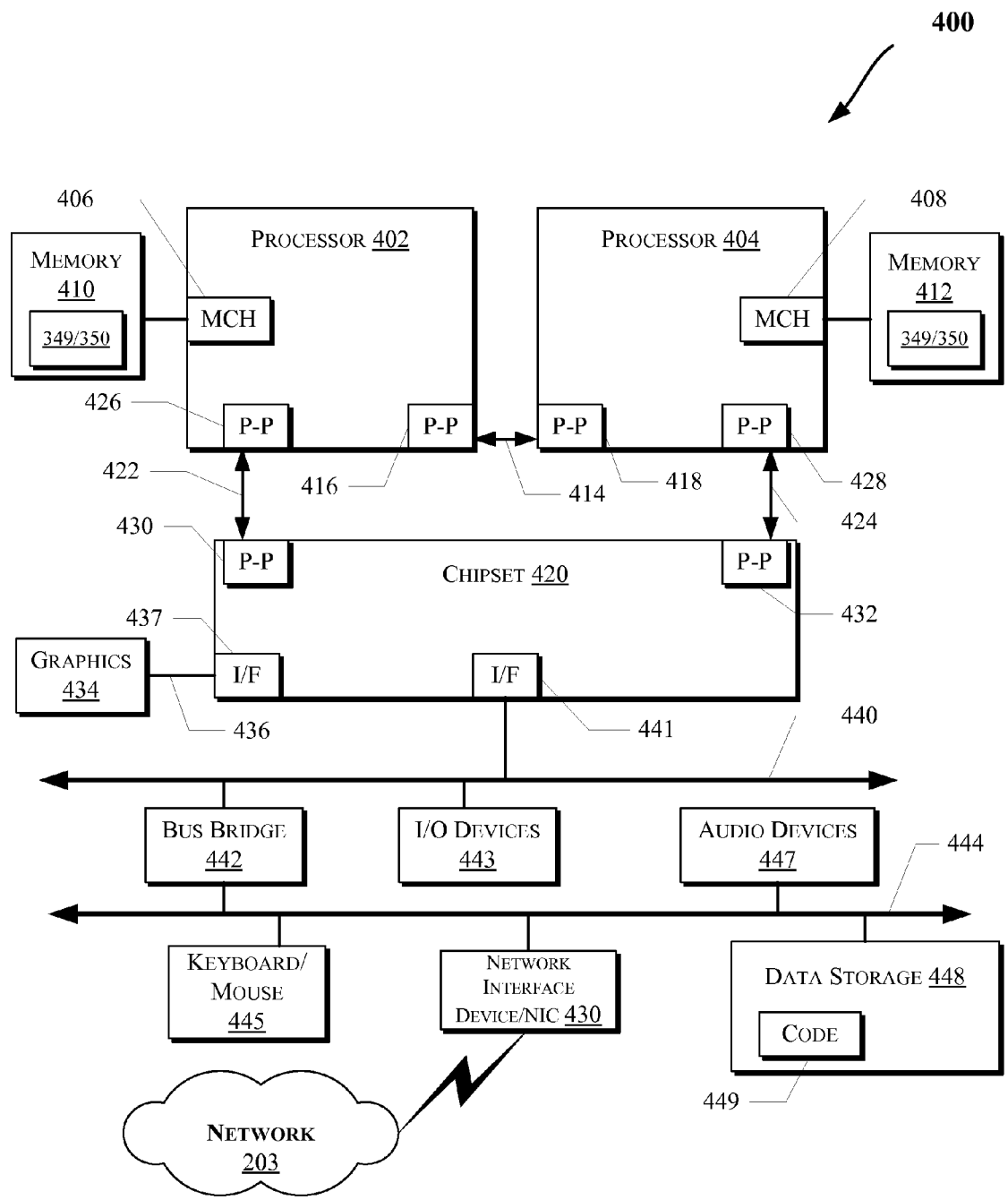

As shown, memory 212 includes an operating system 340 for managing operations of a corresponding computing system (such as systems 200 or 400 of FIGS. 2 and 4, respectively). In one embodiment, operating system 340 includes a hardware interface module 352 that provides an interface to system hardware (such as the memory controller 210 of FIG. 2 or MCH 406/408 of FIG. 4). In addition, operating system 340 includes a kernel 344, one or more file systems 346 that manage files used in the operation of computing system and a process control system 348 that manages processes executing on the corresponding computing system.

In some embodiments, the process control system 348 may include a P-state selection module/logic 349 and a process scheduler logic 350 such as discussed with reference to FIGS. 1-2. However, the P-state selection module/logic 349 and/or process scheduler logic 350 may be provided elsewhere in a computing system and are not required to be part of the OS 340 (such as shown in FIG. 3). For example, hardware circuitry may be provided inside a processor to perform the operations discussed herein with reference to logics 349 and/or 350.

Operating system 340 further includes one or more device drivers 351 and a system call interface module 342 that provides an interface between the operating system 340 and one or more application modules 362 and/or libraries 364. The various device drivers 351 interface with and may generally control the hardware installed in the corresponding computing system.

In operation, one or more application modules 362 and/or libraries 364 executing on computer make calls to the system call interface module 342 to execute one or more commands on the computer's processor. The system call interface module 342 invokes the services of the file systems 346 to manage the files required by the command(s) and the process control subsystem 348 to manage the process required by the command(s). The file system(s) 346 and the process control subsystem 348, in turn, invoke the services of the hardware interface module 354 to interface with the system hardware. The operating system kernel 344 may be generally considered as one or more software modules that are responsible for performing many operating system functions.

FIG. 4 illustrates a computing system 400 that is arranged in a point-to-point (PtP) configuration, according to an embodiment of the invention. In particular, FIG. 4 shows a system where processors, memory, and input/output devices are interconnected by a number of point-to-point interfaces. The operations discussed with reference to FIGS. 1-3 may be performed by one or more components of the system 400.

As illustrated in FIG. 4, the system 400 may include several processors, of which only two, processors 402 and 404 are shown for clarity. The processors 402 and 404 may each include a local memory controller hub (MCH) 406 and 408 to couple with memories 410 and 412. The memories 410 and/or 412 may store various data such as those discussed with reference to the memory 212 of FIG. 2.

The processors 402 and 404 may be any suitable processor such as those discussed with reference to the processors 202 of FIG. 2. The processors 402 and 404 may exchange data via a point-to-point (PtP) interface 414 using PtP interface circuits 416 and 418, respectively. The processors 402 and 404 may each exchange data with a chipset 420 via individual PtP interfaces 422 and 424 using point to point interface circuits 426, 428, 430, and 432. The chipset 420 may also exchange data with a high-performance graphics circuit 434 via a high-performance graphics interface 436, using a PtP interface circuit 437.

At least one embodiment of the invention may be provided by utilizing the processors 402 and 404. For example, the processors 402 and/or 404 may perform one or more of the operations of FIGS. 1-3. Other embodiments of the invention, however, may exist in other circuits, logic units, or devices within the system 400 of FIG. 4. Furthermore, other embodiments of the invention may be distributed throughout several circuits, logic units, or devices illustrated in FIG. 4.

The chipset 420 may be coupled to a bus 440 using a PtP interface circuit 441. The bus 440 may have one or more devices coupled to it, such as a bus bridge 442 and I/O devices 443. Via a bus 444, the bus bridge 443 may be coupled to other devices such as a keyboard/mouse 445, the network interface device 430 discussed with reference to FIG. 4 (such as modems, network interface cards (NICs), or the like that may be coupled to the computer network 203), audio I/O device, and/or a data storage device 448. The data storage device 448 may store code 449 that may be executed by the processors 402 and/or 404.

In various embodiments of the invention, the operations discussed herein, e.g., with reference to FIGS. 1-4, may be implemented as hardware (e.g., logic circuitry), software (including, for example, micro-code that controls the operations of a processor such as the processors discussed with reference to FIGS. 1-4), firmware, or combinations thereof, which may be provided as a computer program product, e.g., including a tangible (e.g., non-transitory) machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Additionally, such tangible computer-readable media may be downloaded as a computer program product, wherein the program may be transferred from a remote computer (e.g., a server) to a requesting computer (e.g., a client) by way of data signals embodied in tangible propagation medium via a communication link (e.g., a bus, a modem, or a network connection).

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus having a processor, the apparatus comprising:
process scheduler logic, the process scheduler logic at least partially comprising hardware logic, to store a plurality of time slice values corresponding to a plurality of execution durations of a first process, wherein the plurality of time slice values are to provide execution history information, corresponding to the first process, to indicate a plurality of previous execution durations of the first process; and
performance state selection logic at least partially comprising hardware logic to:
determine a first performance state value from a plurality of performance state values of the processor in response to a request to switch in the first process, wherein each performance state value is to correspond to a different processor speed and/or frequency, wherein the first performance state value is to be determined based on comparison of a threshold value, corresponding to a median of the plurality of time slice values of the first process, with one or more performance state threshold values, wherein each performance state threshold value is to correspond to a different performance state value of the plurality of performance state values, and
change, based on the comparison, a second performance state value of the processor to the first performance state value and to execute the first process, wherein the second performance state value is to correspond to a second process to be executed prior to receipt of the request to switch in the first process, and wherein change to the first performance state value is to be performed only if the first performance state value corresponds to a faster performance state than the second performance state value.

2. The apparatus of claim 1, wherein the performance state selection logic is to determine the threshold value.

3. The apparatus of claim 1, further comprising a memory to store information corresponding to the second performance state value of the second process executing prior to receipt of the request to switch in the first process.

4. The apparatus of claim 3, wherein the stored information in the memory is to be restored when the second process is subsequently scheduled.

5. The apparatus of claim 3, wherein the memory is to comprise a cache.

6. The apparatus of claim 1, wherein the processor is to comprise the process scheduler logic and the performance state selection logic.

7. The apparatus of claim 6, wherein the processor comprises one or more processor cores.

8. The apparatus of claim 1, wherein the process scheduler logic is to store the plurality of execution durations periodically or upon switching out of a process.

9. The apparatus of claim 1, wherein the performance state selection logic is to determine the first performance state value based on a comparison of the threshold value with one or more lower threshold values or upper threshold values corresponding to each power performance state.

10. The apparatus of claim 1, wherein the threshold value is to be determined based on one or more of an average value or the median value associated with the execution history information.

11. A method comprising:
storing a plurality of time slice values corresponding to a plurality of execution durations of a first process, wherein the plurality of time slice values provide execution history information, corresponding to the first process, to indicate a plurality of previous execution durations of the first process;
determining a first performance state value from a plurality of performance state values of the processor in response to receiving a request to switch in the first process, wherein each performance state value corresponds to a different processor speed and/or frequency, wherein the first performance state value is determined based on comparison of a threshold value, corresponding to a median of the plurality of time slice values of the first process, with one or more performance state threshold values, wherein each performance state threshold value corresponds to a different performance state value of the plurality of performance state values, and
changing, based on the comparison, a second performance state value of the processor to the first performance state value and executing the first process, wherein the second performance state value corresponds to a second process to be executed prior to receipt of the request to switch in the first process, and wherein change to the first performance state value is performed only if the first performance state value corresponds to a faster performance state than the second performance state value.

12. The method of claim 11, further comprising determining the threshold value.

13. The method of claim 11, further comprising storing information corresponding to the second performance state of the second process executing prior to the receipt of the request to switch in the first process.

14. The method of claim 13, further comprising restoring the stored information in response to a subsequent scheduling of the second process.

15. A non-transitory computer-readable medium comprising one or more instructions that when executed on a processor configure the processor to perform one or more operations to:
store a plurality of time slice values corresponding to a plurality of execution durations of a first process, wherein the plurality of time slice values provide execution history information, corresponding to the first process, to indicate a plurality of previous execution durations of the first process;
determine a first performance state value from a plurality of performance state values of the processor in response to receiving a request to switch in the first process, wherein each performance state value corresponds to a different processor speed and/or frequency, wherein the first performance state value is determined based on comparison of a threshold value, corresponding to a median of the plurality of time slice values of the first process, with one or more performance state threshold values, wherein each performance state threshold value corresponds to a different performance state value of the plurality of performance state values, and change, based on the comparison, a second performance state value of the processor to the first performance state value and executing the first process, wherein the second performance state value corresponds to a second process to be executed prior to receipt of the request to switch in the first process, and wherein change to the first performance state value is performed only if the first performance state value corresponds to a faster performance state than the second performance state value.

16. The non-transitory computer-readable medium of claim 15, further comprising one or more instructions that when executed on a processor configure the processor to determine the threshold value.

17. The non-transitory computer-readable medium of claim 15, further comprising one or more instructions that when executed on a processor configure the processor to store information corresponding to the second performance state of the second process executing prior to the receipt of the request to switch in the first process.

18. The non-transitory computer-readable medium of claim 17, further comprising one or more instructions that when executed on a processor configure the processor to restore the stored information in response to a subsequent scheduling of the second process.

19. The non-transitory computer-readable medium of claim 15, further comprising one or more instructions that when executed on a processor configure the processor to restore stored information in response to a subsequent scheduling of the second process.

* * * * *